United States Patent [19]

Tsai et al.

[11] Patent Number: 4,821,794
[45] Date of Patent: Apr. 18, 1989

[54] CLATHRATE THERMAL STORAGE SYSTEM

[75] Inventors: Albert G. Tsai; John F. Westerman; Victor J. Ott, all of San Diego, Calif.

[73] Assignee: Thermal Energy Storage, Inc., San Diego, Calif.

[21] Appl. No.: 176,934

[22] Filed: Apr. 4, 1988

[51] Int. Cl.[4] .............................................. F28D 20/00
[52] U.S. Cl. ................... 165/104.17; 165/10; 62/59; 62/434
[58] Field of Search ................. 165/104.17, 10; 62/59, 62/434

[56] References Cited

U.S. PATENT DOCUMENTS

| | | |
|---|---|---|
| 2,095,008 | 10/1937 | Phillip . |
| 2,363,118 | 3/1942 | Chamberlain . |
| 3,869,870 | 3/1975 | Kuehner ........................ 165/104.17 |
| 4,051,888 | 10/1977 | Yamada et al. ................ 165/104.17 |
| 4,154,292 | 5/1979 | Herrick . |
| 4,237,964 | 12/1980 | Larue et al. .................... 165/104.17 |
| 4,300,622 | 11/1981 | Linder ............................ 165/104.17 |
| 4,466,478 | 8/1984 | Carlsson et al. . |
| 4,540,501 | 9/1985 | Ternes et al. ........................... 62/59 |
| 4,696,338 | 9/1987 | Jensen et al. ........................... 165/10 |

FOREIGN PATENT DOCUMENTS 54-28436 3/1979 Japan .

OTHER PUBLICATIONS

Tomlinson, J. J., "Heat Pump Cool Storage in a Clathrate of Freon," 17th IECEC, 1982, pp. 2060–2064.

Primary Examiner—Albert W. Davis, Jr.
Attorney, Agent, or Firm—Knobbe, Martens, Olson & Bear

[57] ABSTRACT

A thermal energy storage system comprises a closed container, containing a storage medium capable of forming clathrate crystals, an emulsifier pump for intimately mixing the storage medium into a homogeneously suspended mixture and a heat exchanger for forming a cooled solution from the emulsified storage medium. The cooled solution is reinjected into the container under pressure by a plurality of nozzles to mix the storage medium and to form clathrate crystals. The system utilizes the latent and sensible heats of clathrate hydrate storage materials to promote effective heat transfer into and out of the system.

26 Claims, 2 Drawing Sheets

CLATHRATE THERMAL STORAGE SYSTEM

BACKGROUND OF THE INVENTION

The present invention relates to thermal storage systems, and particularly to a phase change thermal storage and heat transfer system useful for heating, air conditioning, and process cooling.

Thermal storage systems including latent heat storage systems based on clathrate hydrates have proven effective for storing thermal energy through the formation and decomposition of clathrate material. A clathrate is a compound formed by the inclusion of molecules of one kind in the cavities of the crystal lattice of another. This change of phase is a result of an enthalpy change that is commonly 100 to 144 BTUs per pound of clathrate material within the system.

Thermal storage systems using clathrates show great promise in facilitating efficient utilization of heating and cooling energy. In many countries, including the United States, electrical energy used for cooling is available at reduced rates during periods when electrical demand is low. Energy stored in phase change materials using such "off-peak" electricity can be released and used during peak periods, reducing overall energy costs.

The energy storage density of many clathrates is extremely high, assuming efficient conversion of the storage medium to clathrate. Therefore, it is possible for an efficient cooling system utilizing clathrate storage materials and a relatively small chiller operating in the charge mode for several hours to provide an instantaneous cooling capacity equivalent to that of much larger conventional air conditioning equipment. This size savings is a significant advantage, regardless of whether off-peak electrical energy is available at reduced rates.

In addition to storage for cooling or, in appropriate circumstances, heating, another major potential use for clathrate storage systems is in water purification. Clathrate crystal formation can occur at temperatures well above 32° F., and the clathrate crystal contains only water and hydrate agent (usually a gas molecule). Impurities in the liquid water from which the clathrates are formed are not included in the crystalline structure. Thus, impure water may be used to form clathrates, the clathrate crystals may be separated from the remaining water, the separated crystals may be melted to provide pure water and hydrate agent, and the hydrate agent may be recycled to form additional clathrate.

One practical difficulty with existing water purification systems utilizing clathrates is that impurities are sometimes entrapped in the large crystals that form when the unit crystals agglomerate.

One approach for utilizing phase change storage materials is described in U.S. Pat. No. 4,696,338 to Jensen, et al., and assigned to the assignee of the present invention. This system employs direct contact heat exchange for the purposes of agitation and the transfer of heat into and out of the system. Typically, systems employing this type of heat exchange, in which heat exchange takes place within the storage medium, require the use of custom-made heat exchanger coils and other components, making the system relatively expensive to manufacture.

Other systems employ heat exchangers inside the storage tank. These systems tend to create large crystalline masses within the tank. In this case, when it is desired to cool a system, warm liquid is sent through a heating/cooling coil (or other heat exchanger), which melts the crystalline mass surrounding the coil and thereby cools the fluid therein. As the frozen storage material around the coil melts, a warm water pocket forms around the coil, surrounded by the remaining crystalline mass. Thus, after a certain amount of time, cooling occurs primarily through natural convection (as opposed to forced convection and conduction), which in a large system is a time consuming, inefficient method of transferring heat.

Similarly, when charging the system, solid crystalline masses tend to form in layers which emanate from the cooling coil. Accordingly, the outer layers of the crystal will tend to form much more slowly than the inner layers, because heat transfer by conduction through the crystalline mass is relatively inefficient.

Another approach, described in U.S. Pat. No. 4,051,888 to Yamada, et al., is a system which uses external heat exchange. A major disadvantage of a system of this type is the tendency to form large clathrate crystals. Larger crystals, because of their size, are very difficult to transfer through the heat exchanger. The resultant poor flow characteristics, caused by the formation of large clathrate crystals, greatly reduces the efficiency of the heat exchange process during the discharge cycle. Yamada, et al. describe a crystal crusher to deal with this problem. Additionally, the system described by Yamada, et al. is designed to supplement chilled water storage systems, and is thus content with low reaction yields.

Thus, while systems employing the formation and decomposition of clathrate material have been effectively used, obtaining complete reaction of water and hydrate agent during the charge cycle has proven difficult. Further, the formation of large crystalline masses within the storage tank of previous systems has inhibited effective and rapid heat transfer into and out of the storage system.

SUMMARY OF THE INVENTION

Accordingly, it is an object of the present invention to provide a thermal storage system incorporating the latent and sensible heats of clathrate hydrate storage materials to promote effective heat transfer into and out of the system.

Furthermore, it is an object of the present invention to provide a method of circulating a clathrate slurry, thereby achieving enhanced clathrate production through increased agitation and heat transfer.

Still another object of the present invention is to increase the effectiveness of the heat exchanger during the discharge cycle of the system.

Yet another object of the present invention is to provide a system in which the clathrate crystals formed are small in size, and suspended in a homogenous slurry, rather than an "iceberg" as seen in previous systems.

Moreover, another object of the invention is to provide a device which minimizes the use of special parts, and can be made primarily from conventional "off-the-shelf" components, thereby decreasing the costs of manufacture.

These as well as other objects of the present invention are met by providing a system and method in which a sealed container forms a storage tank, suitable for housing a clathrate hydrate storage medium. The clathrate hydrate storage medium may advantageously comprise water and a hydrate agent. Preferably, the hydrate agent has a specific gravity different from that of water, i.e., the relative densities are such that the hydrate agent will tend to either sink to the bottom of the container, while the water will tend to float toward the top of the container, or vice versa. The clathrate slurry formed during the charge cycle typically has a density intermediate to that of the water and hydrate agent, so it will tend to be disposed in the middle of the tank, suspended between the water phase and the hydrate agent.

In one embodiment of the invention, located near the top of the storage tank is an excess water overflow reservoir. Water rich solution, occupying the space near the top of the tank, is decanted through the overflow reservoir, and externally mixed with hydrate agent in an emulsifier, which, in the preferred embodiment, comprises a mixing pump. Hydrate agent is directed into the emulsifier by a hydrate agent pump or other suitable means, disposed at the bottom of the tank. In one embodiment of the invention, the hydrate agent pump is rendered unnecessary by the different hydrostatic pressures of the hydrate agent and the water in the overflow reservoir.

The emulsifier thoroughly mixes the water rich solution and the hydrate agent, such that the hydrate agent is suspended homogeneously in the water. The homogeneous solution is then passed through a heat exchanger to cool the mixture to a point at or below the phase change temperature. Some initial clathrate formation begins to take place in the heat exchanger; however, the principal clathrate formation occurs after the super-cooled emulsion from the heat exchanger is injected into the storage tank. The formation of a homogeneous suspension of the hydrate within the water, prior to passing the mixture through the heat exchanger, as well as the constant agitation and emulsification supplied by the system, serves to minimize the size of the clathrate crystals formed, thereby minimizing the amount of trapped (and therefore unutilized) hydrate agent between the unit crystals of clathrate agglomerates.

During the charge cycle, a conventional chiller may be employed to supply cold heat transfer fluid to the system. Heat transfer fluid is run through a heat exchanger accessed to the chiller or other cold sink. As the heat transfer fluid removes heat from the homogeneous solution passing through the other side of the heat exchanger, crystals begin to form. Thus, this transfer of sensible heat from the clathrate-forming mixture to the heat transfer fluid is responsible for the initial formation of clathrates. The cooled mixture is injected into the storage tank through nozzles that are canted to induce circulation within the tank. The nozzles further serve to further mix or emulsify the storage medium and to induce nucleation.

The discharge cycle operates in much the same way as the charging cycle, with the exception that hydrate agent is not pumped from the bottom of the tank to the mixing pump. Instead, cooled liquid is decanted off the top of the tank through the overflow reservoir, and is passed through the heat exchanger. This cooled liquid, after being passed through the heat exchanger, is injected back into the tank through tangentially placed nozzles, as warmed liquid. The warmed liquid so injected into the storage tank serves to melt clathrate crystals disposed therein. The swirling circulation pattern produced by the injection of liquid back into the storage tank thoroughly mixes the contents thereof. It should be noted that until the phase change is complete, the entire contents of the storage tank is of substantially the same temperature (at or near the phase change temperature), and thus cooled water rich solution can be continuously decanted off the top of the storage tank. The clathrate crystals are relatively small and, thus, have a large surface area in contact with the water in which they are suspended. This facilitates rapid movement of sensible heat into and out of the storage material.

DETAILED DESCRIPTION OF THE PREFERRED EMBODIMENT

Figures 1, 2:
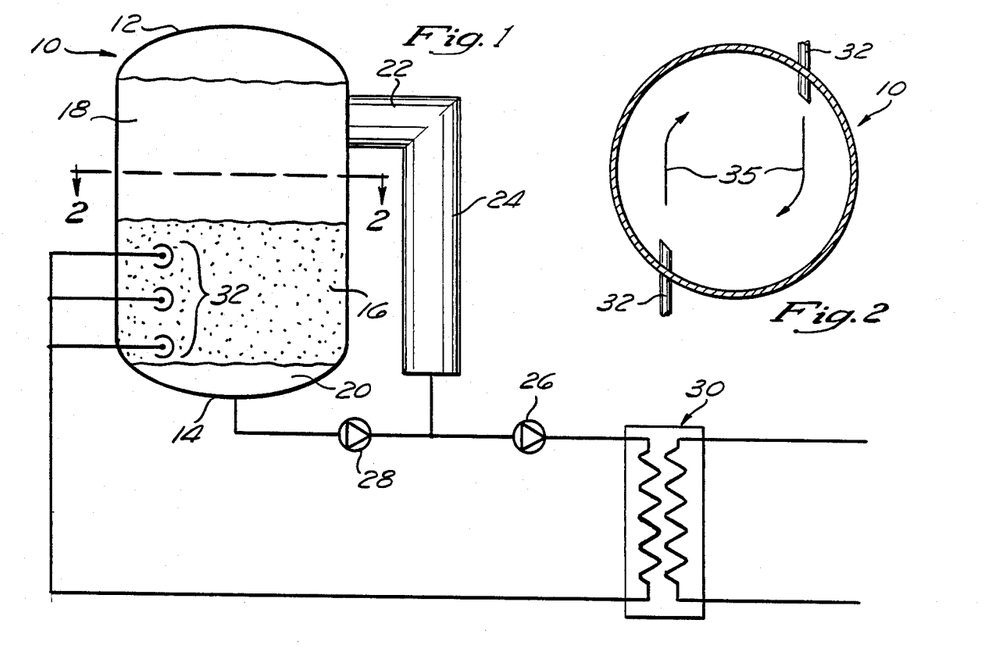
FIG. 1 is a schematic representation of the thermal storage and heat transfer system of the present invention.
FIG. 2 is a cross-sectional schematic top view of the storage tank taken along the line 2—2 in FIG. 1, showing the tangential placement of the nozzles, and induced circulation pattern within the tank.

Referring to FIG. 1, there is depicted a thermal energy storage and heat transfer system which can be employed either as a stand alone unit or as a retrofit unit in conjunction with existing equipment. The system comprises a sealed container 10 (preferably insulated), forming a storage tank, which can be made, for example, of carbon steel. The container is preferably cylindrical with a dome-shaped top end 12 and a dome-shaped bottom end 14. Disposed within the storage tank 10 is a storage medium 16, comprised of water 18 and a liquid hydrate agent 20. The hydrate agent 20 may be any suitable clathrate-forming or hydrate-crystal forming material. Preferably, the storage density of the clathrate is between 50 and 144 BTUs per pound of the entire storage medium.

Hydrate phase change materials (such as clathrates) for use in the present invention are selected from crystallizable substances of which the melting point is in a range determined by the temperature at which it is desired to deliver heat or cold and, in some situations, by the temperature of a heat or cold supply available for providing heat to or removing heat from the body of the phase change materials. It is also desirable to select materials which have a large heat of crystallization. For domestic space cooling, materials which change phase at temperatures in the range from about 32° F. to about 48° F. are particularly useful. These temperatures may be varied to some degree by the inclusion in the storage medium of one or more well known additives for varying the phase change temperature, which include preferably non-corrosive, water-miscible liquids. One suitable category of materials is alcohols and polyhydroxy compounds such as propylene glycol, ethylene glycol, ethanol, and isopropanol in a concentration not to exceed more than about 20% by volume of the water volume contained in the storage tank.

Gas hydrates constitute a class of clathrates or inclusion compounds in which a hydrogen-bonded water molecule lattice encloses a guest molecule of gas. There are many gases which can form gas hydrates, including the noble gases, halogens, straight-chain hydrocarbons and halogenated hydrocarbons, including common refrigerants used in vapor compression cycles. The focus of the present invention is not any particular hydrate agent. Clathrate-forming agents are well known and any of the many suitable conventional or exotic materials may be used. However, in preferred embodiments, such hydrate agents can include chlorodifluoromethane, dichlorofluoromethane, dichlorodifluoromethane, trichlorofluoromethane, propane, isobutane, butane or methane. Although these materials are referred to herein as "gases" because they usually are in gaseous form at standard temperature and pressure, it will be understood that these materials are in liquid form in the system of the present invention, and the system is operated at an internal pressure sufficient to maintain these hydrate agents in liquid form. The size of the guest molecule of gas, as well as the solubility of the molecule in the water component of the storage medium, are two well known factors which aid in the formation of the desired clathrate.

The clathrate structure constitutes a crystalline lattice of water enclosing molecules of gas in cavities of the lattice. There are two basic crystalline structures for gas hydrate clathrates. See, e.g., D. Davidson, *Clathrate Hydrates, in Water, A Comprehensive Treatise,* Chapter 3 (F. Franks, Ed.)(Vol.2, 1973). Type I gas hydrates comprise 46 water molecules surrounding two small cages (3.91 Å average radius) and six large cages (4.33 Å average radius). Depending on the size of the guest (hydrate agent) molecule, less than all of the cages may be occupied.

Type II gas hydrates are more complex. These clathrates comprise a lattice of 136 water molecules, forming 16 small cages (3.90 Å average radius) and eight large cages (4.68 Å average radius).

The primary determinant of the clathrate structure (i.e., Type I or II) is the size of the gas molecule. Type I is generally formed only by gas molecules with an average van der Waals diameter not exceeding 5.3 Å. The average diameter of the guest molecule in a Type II clathrate is 5.5 Å to 6.6 Å. For most common gas hydrates, the particular structures formed and the extent to which the cages are filled are matters of conventional knowledge. Moreover, for new gas clathrates, these attributes can be readily determined.

In a preferred embodiment of the present invention, a substantial amount of excess water is present over and above the amounts required for the stoichiometric formation of clathrate from all of the gas molecules in the system. This excess water, in conjunction with the particular structure and mode of operation of the storage system of the present invention, facilitates the formation of a slurry of fine clathrate crystals, without the formation of large crystals or blocks of crystalline material. This clathrate/water slurry can easily move through external heat exchangers of conventional design.

The upper limit of the amount of excess water utilized in the system is determined primarily by practical considerations of heat storage per unit volume of material in the storage tank. In order to maximize the heat storage capacity of the system, the amount of excess water is only so much as is necessary to form a slurry of the crystals when the system is fully charged. In most instances, the amount of water will be no greater than double the amount required to stoichiometrically form clathrate crystals with all the gas molecules in the system, and is preferably much less. For Type I clathrates, the mole ratio of gas to water for complete clathrate formation is generally from 1:5 to 1:8. For Type II clathrates, the ratio is generally from 1:16 to 1:18. Thus, the actual relative molar amounts of water used will vary with the particular gas molecule selected. Whatever those amounts are, the present invention contemplates use of an excess amount of water of no more than 100%, preferably no more than about 30% or 40%, more preferably no more than about 15% or 20%, and most preferably no more than about 5% or 10% in excess of the amount of water needed for complete clathrate formation with all the hydrate agent in the system.

Generally, the gases used as hydrate agents are only slightly soluble in water. When placed in the container together, the liquid hydrate and water tend to separate into two layers. If the liquid hydrate agent is more dense than water, it tends to accumulate on the bottom of the container. If, however, the hydrate agent is less dense than water, it will tend to float toward the top of the container. In either case, gas hydrates are particularly useful as cool storage media, as they exhibit a high heat of formation.

In addition to the water and hydrate agent, the storage medium may contain a small amount of surfactant. The surfactant is added to promote mixing of the water and hydrate, and to enhance the formation of an emulsion between these substances. The choice of a suitable surfactant depends to a large extent on the nature of the hydrate agent. Suitable categories of surfactants include both ionic and nonionic surfactants, and particular surfactants that may be used with an appropriate hydrate agent include sorbitan derivatives, glycerol derivatives, cetyl alcohol derivatives, the various polyoxyalkylenes, and sulfonates. Particular surfactants include sorbitan trioleate and polyoxyethylenated sorbitans, glycerol monostearate, propylene glycerol monostearate, sodium cetyl stearyl sulfate, cetyl ethyl morpholinium ethosulfate, polyoxyethylene alkyl amines, alkyl aryl sulfonates, and any of the other well known surfactants that are suitable for forming water emulsions of hydrate agents.

When the hydrate agent is a fluorocarbon, fluorinated surfactants may be used to advantage. Both ionic and nonionic fluorocarbon surfactants are well known, and in many cases differ from hydrocarbon surfactants only in that some or all of the carbon-hydrogen bonds are replaced with carbon-fluorine bonds, or in that a fluorocarbon chain has been added. Examples of fluorinated surfactants include perfluorocarboxylic acids, perfluoroalkyl polyoxyethylenated alcohols, and ammonium fluoroalkyl phosphates. Surfactants sold by E. I. du Pont de Nemours, Inc., Wilmington, Del. under the trademark ZONYL have been found to be particularly effective for use with freon hydrate agents. These surfactants include ZONYL FSN, ZONYL FSA, ZONYL FSC and ZONYL FSK. Most of the ZONYLs are believed to have a fluorocarbon chain of from 6 to 16 carbon units.

The concentration of surfactant used will depend on the particular surfactant and hydrate agent combination utilized to form the storage medium. For any such combination, the correct proportions to be used to facilitate emulsion formation without undue foaming can be readily determined by a person of ordinary skill in the art. Typical concentrations of surfactant are from about 1 to 5000 ppm, more often 10 to 2000 ppm, and preferably at least 20 or 40 ppm but not more than about 1000 ppm, all with respect to the total liquid volume of the storage tank. In one preferred embodiment, using trichlorofluoromethane ($CCl_3F$) as the hydrate agent, the surfactant may be ZONYL FSN in the amount of about 200 to 300 ppm.

Disposed on the upper portion, preferably the upper one-fourth or one-fifth of the storage tank 10, is an excess water overflow reservoir 22. The overflow reservoir 22 illustrated in FIG. 1 is comprised of a relatively large pipe, which may advantageously be approximately four to ten inches in diameter in a 250–750 gallon storage tank. Alternatively, the overflow reservoir may have any desired configuration, so long as it can function to decant relatively clathrate-free water from the tank 10. Of course, the critical parameters that determine the size of the tube are the rate of heat transfer in the system and the resulting liquid flow volume through the heat exchanger. Whatever that volume is, the overflow tube should be selected to give the desired low fluid velocities. The use of a large diameter overflow tube allows low to negligible flow velocities in the tube (e.g., 0.1 to 1.0 feet/second or less). These low flow velocities minimize the amount of clathrate entrained in the decanted water. Thus, a water rich solution 18 is decanted off the top 12 of the storage tank 10 and accumulated in a standpipe 24, located adjacent to the storage tank 10.

This decanted water rich solution 18 is fed into a mixing pump 26, which serves as an emulsifier. Hydrate agent 20 accumulated on the bottom 14 of the storage tank 10 may be pumped by a hydrate agent pump 28 to the mixing pump 26, where it is thoroughly mixed with the water rich solution, such that the hydrate agent 20 is homogeneously suspended in the water 18, usually as a fine emulsion. The hydrate agent pump 28 can also be used as a way of adjusting, metering or controlling the hydrate agent to water ratio delivered to the heat exchanger. Alternatively, the hydrate agent may simply flow under hydrostatic pressure to the emulsifier/pump 26. That is because the hydrate agent is heavier than the water in the standpipe 24, and thus the hydrostatic pressure at the bottom of the tank 10 is greater than that of a column of water at the height of the liquid in the tank. The emulsifier 26, in addition to facilitating nucleation, serves to chop up any crystals decanted with the water rich solution 18, by virtue of its constant agitation characteristics. This constant agitation and emulsification that takes place in the mixing pump 26 ensures that the crystals formed are of a minimal size. The pumps 26, 28 may, in a preferred embodiment, be centrifugal pumps or positive displacement pumps.

After being thoroughly mixed in the mixing pump 26, the homogeneously suspended solution travels through one or more heat exchangers 30, disposed outside of the storage tank 10. The heat exchangers 30 can be one of several types of conventional liquid to liquid, liquid to gas, or black body radiation heat exchanger configurations, including, but not limited to coaxial straight tube, fluted tube coaxial, shell and tube, plate frame, fan coil, heat pipe, selective radiator, ballast tank, or ballast tank with multiple coils and tubes with fins and extended transfer area. A conventional chiller (not shown) may be used to supply cold transfer fluid to the heat exchanging means 30, for the purposes of charging, i.e., forming clathrates. This chiller may, for example, be a heat pump, a conventional refrigeration apparatus, or simply a heat exchanger in a cold ambient location. Alternatively, any other source of cold fluid may be used.

Because the phase change material is a crystalline slurry or silt like material instead of a solid mass, the phase change material may be charged by direct circulation within the storage tank 10. As the solids in the slurry settle toward the bottom 14 of the tank 10, the overflow reservoir 22 and standpipe 24 tend to fill with water rich solution 18, thereby aiding the pumping and circulation of the fluid through the heat exchanging means 30.

As the solution passes through the heat exchanger 30, clathrate formation, due to a change in enthalpy, begins to take place. The crystals formed, by virtue of their small size, create a slurry of clathrate material mixed in with excess water and unreacted hydrate agent. The resulting solution is then injected back into the storage tank 10 through a plurality of nozzles 32.

The nozzles 32, as shown in FIG. 2, are tangentially placed so that a circulation pattern, as indicated by the directional arrows 35, is set up within the storage tank 10. This circulation pattern creates a swirling motion which facilitates emulsification of the contents of the storage tank 10, breaks up crystals or clumps of crystals, and enhances nucleation and further formation of clathrate crystals. Optionally, a pump (not shown) may be provided in the feed line leading to the nozzles, adjacent to the nozzles, to mechanically induce and facilitate nucleation just prior to injection of the mixture into the tank through the nozzles 32.

In one preferred embodiment, the crystal fraction of a fully charged system is between 25 and 100% of the total liquid volume, and the amount of water, by weight, is up to 100% over and above the specified mole ratio of 1:16 to 1:18 for Type II clathrates and 1:5 to 1:8 for Type I clathrates.

Figure 3:
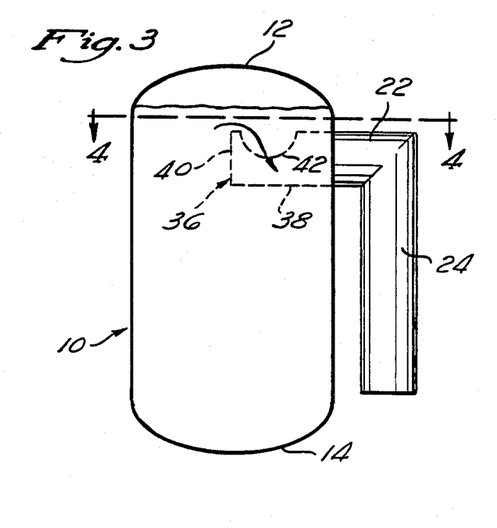
FIG. 3 is a schematic side elevation of one embodiment of an overflow tube in the storage tank.
Figure 4:
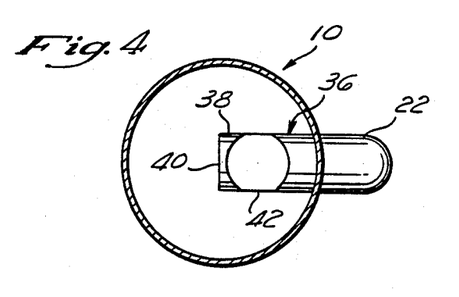
FIG. 4 is a cross-sectional top view taken along the line 4—4 in FIG. 3, showing the inlet hole and extension of the overflow tube.

Various methods may be used to enhance the flow of clear liquid into the overflow reservoir 22. FIGS. 3 and 4 depict a horizontal skimmer 36, comprising an extension 38 of the overflow tube 22, disposed within the tank 10. The skimmer 36 has a capped end 40 inside the tank, which prohibits the water rich solution 18 from flowing through the external overflow reservoir 22 therefrom. A hole 42 is cut out of the top half of the extension 38, such that relatively clear water can be slowly skimmed off the top 12 of the tank 10 and into the overflow reservoir 22. The main design considerations governing the location and configuration of the inlet to the overflow reservoir are (1) that it should be in a location where the water is at least somewhat depleted of clathrate crystal (such as near the top of the tank 10 and/or behind baffles that minimize mixing near the inlet), and (2) that it should be of sufficient size that flow velocities therethrough are low (e.g., no more than 1.0 feet/second, and preferably 0.5 or 0.3 feet/second or less) to minimize the amount of clathrate drawn into the inlet.

Figure 5:
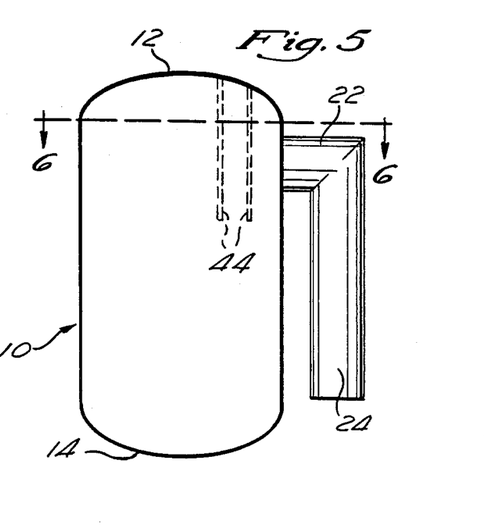
FIG. 5 is a schematic side elevation of an alternate embodiment of an overflow tube in which vertical baffles are employed to slow or stagnate flow around the inlet to the overflow.
Figure 6:
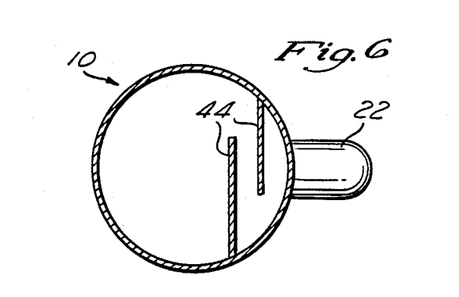
FIG. 6 is a cross-sectional top view of the storage tank showing a baffle arrangement, taken along the line 6—6 in FIG. 5.

The use of baffles to reduce the amount of crystals in the decanted water is depicted in FIGS. 5 and 6. In this embodiment, a pair of vertical baffles 44 are inserted into the tank 10 to separate, by stagnation, the lighter liquid (water) component 18 of the tank contents 16 from the heavier solid components. Such an arrangement enhances the ability of the system to decant a substantially solid-free liquid into the overflow reservoir 22, thereby facilitating efficient pumping and heat exchanger operation. It should be noted, however, that the crystals are sufficiently fine that some crystal transport through the heat exchanger is not detrimental.

Figure 7:
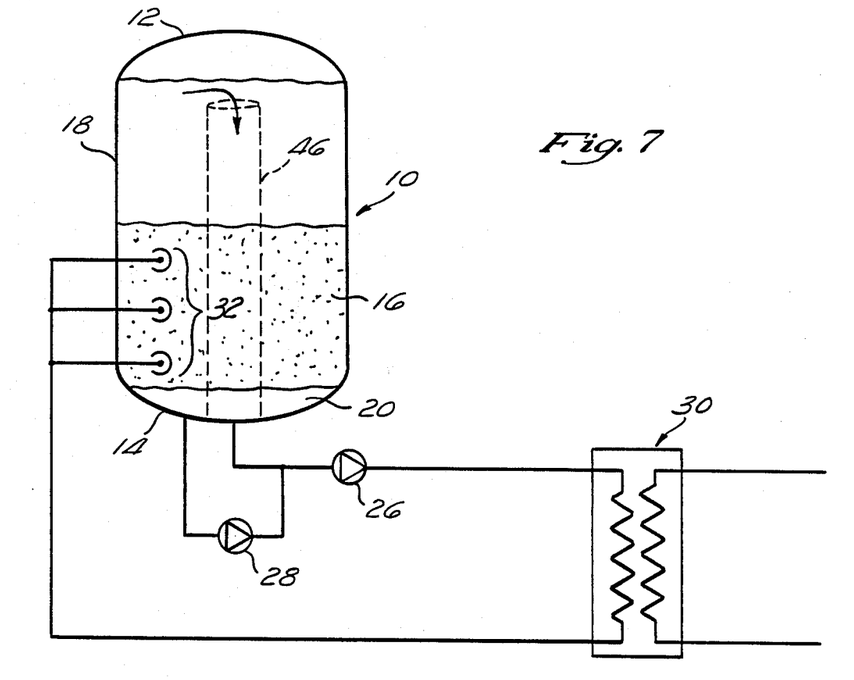
FIG. 7 is a schematic representation of the thermal energy storage system in which the overflow tube is internally placed within the storage tank.

In a further alternative embodiment, illustrated in FIG. 7, the overflow tube 46 may be disposed entirely within the storage tank 10, in a vertical fashion. In this case, the large diameter internal overflow tube 46 may advantageously be approximately three-fourths, four-fifths, or more of the height of the storage tank 10, and positioned substantially in the center thereof. As in the case of the horizontal skimmer 36, water rich solution is skimmed from the top 12 of the tank 10 and into the overflow reservoir 46, where it accumulates until it is pumped into the emulsifier 26.

To operate the system, storage medium 16, comprising water 18, hydrate 20 agent and a small amount of surfactant are loaded into a sealed vessel 10. The vessel 10 is then evacuated to remove air and other gases loaded with the storage medium 16. In the preferred embodiment, the hydrate agent 20 is selected such that the relative density of the hydrate agent 20 is greater than that of the water, thereby causing the hydrate agent 20 to sink to the bottom 14 of the tank 10.

An optional hydrate agent pump 28, positioned at the bottom 14 of the tank 10, serves to pump hydrate agent 20 accumulated on the bottom 14 of the tank 10 to an emulsifier circuit 26. Water rich solution 18, disposed at the top 12 of the vessel 10 is decanted therefrom, into an overflow reservoir 22 and accumulates in a large standpipe 24, located adjacent to the storage tank 10. This water rich solution 18 is also pumped into the emulsifier circuit 26, where it is thoroughly mixed with hydrate agent 20.

The emulsifier 26 creates a homogeneously suspended mixture or emulsion, suitable for passing through a heat exchanger 30. The cooling system is charged as heat transfer liquid coupled to a cold sink is run through the heat exchanger. As the heat transfer fluid removes heat from the homogeneously suspended storage medium 16, clathrate crystals begin to form.

The resulting slurry of clathrate hydrate material is then injected back into the storage tank 10 through a plurality of tangentially placed nozzles 32. The tangential displacement of the nozzles 32 creates a circular swirling pattern within the storage tank 10, causing emulsification of the contents thereof, and facilitating in the formation of additional crystals. This constant circulation of the contents within the storage tank 10 lends itself to a high heat transfer rate, thus providing an efficient method of charging the system.

In the process of the present invention, the size of the clathrate crystals is exceptionally small, due to the process conditions under which they are formed. In fact, the crystals have the appearance of fine silt, and are easily redispersed by simple agitation even after they settle out of the excess water in the slurry. Although particle sizes of 1000 $\mu$m (or even larger) are contemplated in connection with the present invention, and will operate in the present system, it is preferred that the maximum average particle size of the clathrate be about 1000 $\mu$m or about 500 $\mu$m. The minimum size is not critical, but will generally be greater than about 10 $\mu$m or about 50 $\mu$m. The finer the emulsion of water and gas hydrate agent, the finer the crystals that will be formed. Mechanical forces generated in the mixing pump or emulsifier 26 and in the nozzles 32, the swirling or mixing action in the storage tank 10, and the use of a surfactant all facilitate creation and maintenance of a fine emulsion during crystal formation.

The production of small clathrate crystals is also desirable because larger sized crystal groups or agglomerates can entrap substantial amounts of unreacted hydrate agent. The yield of clathrate crystals produced by this process is relatively high. In the preferred embodiment, the conversion rate is between 25 and 100% of the hydrate agent contained in the storage tank from liquid components to solid cool storage material.

The system of the present invention may be charged at night when electric power is available at a low price, or during winter when outside temperature is low, by a conventional refrigeration coil. The heat transfer fluid pumped through this coil is thus cooled by either an electrically powered refrigerator or by exchange with outside ambient air having a temperature below the phase change temperature of the storage material. Even if the night air temperature is not that low, a heat pump coupled to cooler night air can result in low energy costs during the storage cycle. Of course, any suitable cold sink can be used, such as, without limitation, those utilizing air to air coupling or air to water source coupling, including ground coupled systems. The particular type of heat exchanger is not critical to the invention, although it can be important to the economics or feasibility of any particular application to which the invention is applied. Thus, conventional heat pipes can be used, as can fan coils and selective radiators. (Selective radiators are a type of heat exchanger that transfer heat through black body radiation, and that selectively or preferentially radiate at a particular wavelength. Devices that selectively radiate in the infrared show particular promise.)

When cooling is needed, heat transfer liquid from the heat exchanger 30 may be pumped to the point where heat is to be absorbed, e.g., a room or other space to be cooled, and vaporizes to effect cooling or otherwise picks up heat to be transferred to the liquid from the tank 10. As during the charging cycle, the liquid from the tank 10 passes through the heat exchanger 30 and is injected back into the storage tank 10 through the tangentially placed nozzles 32. As the warmed liquid is recirculated back into the tank 10, the clathrate crystals begin to melt, thereby removing their latent heat of formation from the warmed water, and thus effecting cooling of the water. The constant circulation of the crystalline slurry of clathrate material in the tank 10 maintains a substantially evenly distributed temperature within the storage tank 10. Thus, as clathrate material melts and is circulated within the tank, a steady stream of cooled, constant-temperature water can be decanted off the top of the tank. This technique of constantly circulating the crystalline slurry within the tank yields an effective, efficient method of cooling.

Figure 8:
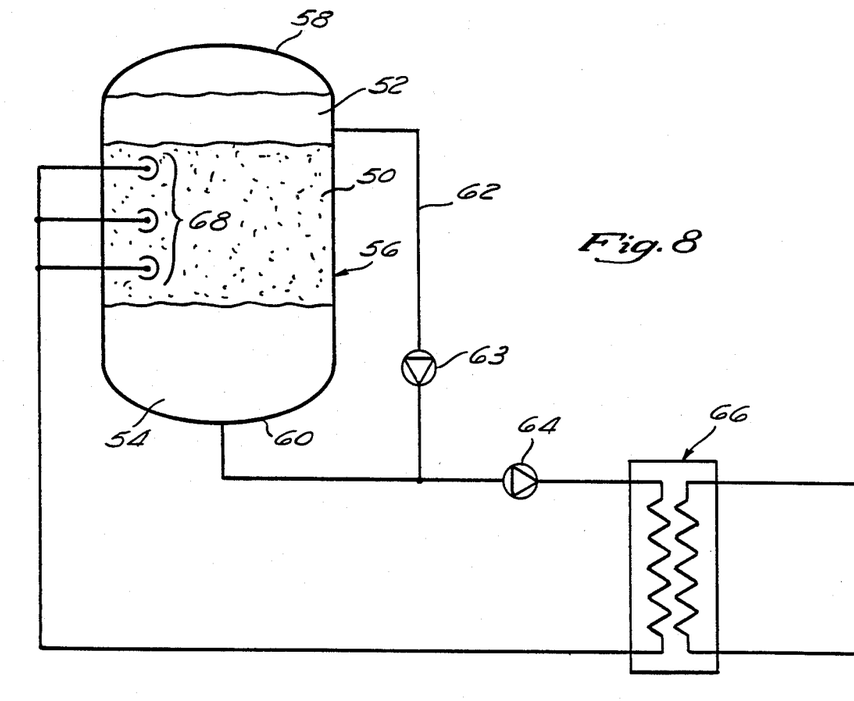
FIG. 8 is a schematic representation of an alternative embodiment of the system in which the hydrate agent is less dense than the water, and thus the water settles to the bottom of the tank.

In the case where the storage medium 50 comprises a hydrate agent 52 having a density relatively less than water 54, the system can be modified as shown in FIG. 8. In this embodiment, the system comprises a storage tank 56, made for example of carbon steel, which may have dome-shaped top and bottom ends 58, 60, respectively. Although dome shaped ends are preferred because of their ability to withstand internal pressure, other configurations that satisfy the design requirements of the system may be used. Disposed within the upper one-fifth of the tank 56 is a small diameter tube 62 through which hydrate agent 52 can be removed. A pump 63 may be provided to move this hydrate agent through the tube 62.

Since the relative densities of the storage medium 50 in this embodiment are such that the hydrate agent 52 is lighter than the water 54, there is no need for an excess water overflow reservoir as in the preferred embodiment. Instead, relatively clear water 54 accumulates at the bottom 60 of the tank 56, where it is allowed to flow into a mixing pump 64. The mixing pump 64 serves as an emulsifier and thoroughly mixes water 54 and hydrate agent 52 such that the hydrate agent 52 is homogeneously suspended in the water 54.

The homogeneous solution is then passed through a heat exchanger 66, where some clathrate formation begins to take place. From there, the chilled slurry is injected back into the storage tank 56 through a plurality of tangentially placed nozzles 68, where further crystal formation takes place. The nozzles 68, so arranged, create a circular swirling pattern which constantly circulates the storage material within the tank. The discharge cycle in this case is analogous to that described above.

Another important aspect of the present invention is that it permits clathrates to be used directly for heating or cooling at a location remote from the storage location, without the use of any heat exchange fluid besides the contents of the storage tank. In this embodiment of the invention, cold water or clathrate slurry from the storage tank may be used directly to cool a space, material, or object by placing an external heat exchanger directly in that space, material, or object and circulating the liquid from the storage tank through the heat exchanger. Thus, for example, air conditioning may be provided by circulating the liquid from the storage tank through a liquid-to-air heat exchanger in the space to be cooled. The ability to use the system disclosed herein with these and other types of discharge heat exchangers is a significant advantage of the present invention.

EXAMPLE 1: HYDRATE AGENT HEAVIER THAN WATER

A storage material comprising 149 gallons water and 31 gallons trichlorofluoromethane ($CCl_3F$) was charged into a 200 gallon cylindrical storage tank having the geometry shown in FIG. 3. This storage tank was a part of a thermal energy storage system configured as in FIG. 1. Also present as a part of the storage material was a nonionic fluorocarbon surfactant, sold by E. I. du Pont de Nemours, Wilmington, Del., under the trademark ZONYL FSN, present in the amount of about 300 ppm (measured in relationship to the entire contents of the storage tank). This storage material forms a Type II clathrate having a phase change temperature of 48° F. and a latent heat of fusion of 122 BTU/lb. The mole ratio of hydrate agent to water for this clathrate is 1:16.63, and the specified amount of water used in this Example is an excess of 50% over the amount required for clathrate formation with the hydrate agent present in the system.

The storage or charge cycle was initiated by removing water from the standpipe 24 at a rate of 19 gallons/minute and simultaneously removing hydrate agents from the bottom of the storage tank at a rate of about 1 gallon/minute. The water and the hydrate agent ($CCl_3F$) were mixed in the mixing pump 26 and directed through the heat exchanger 30. The heat exchanger used was a plate frame type utilizing stainless steel plates and nitrile rubber gaskets.

The temperature of the liquid emulsion entering the heat exchanger 30 was initially about 65° F., but within 70 minutes, that temperature had dropped to 48° F., the formation temperature of the clathrate. Simultaneously, a cold heat transfer fluid was introduced into the other side of the heat exchanger at a temperature of 40° F. at 6 gallons/minute. The heat transfer fluid was 20% ethylene glycol in water (v/v) from a conventional chiller operated at night with off-peak electricity. The temperature of the storage medium exiting the heat exchanger was a constant 46° F., and some crystal formation began to take place at this point.

The cooled storage medium leaving the heat exchanger was directed through 3 nozzles into the lower mid portion of the storage tank. The nozzles were canted at an angle of about 60° with respect to a tangent to the circular storage tank at the point where the nozzles were located, and had a nozzle tip diameter of about ½ inch, so that the velocity of the fluid through the nozzle tip was about 10 feet/second, thus generating high shear forces and increasing nucleation and emulsification, while simultaneously inducing a swirling motion in the mixture in the tank about the axis of the tank. This swirling motion was effective to maintain the clathrate crystals in suspension. However, due to the fact that the density of the clathrate is about 1.15 g/cc (compared to about 1.0 g/cc for water at 46° F.), there was a tendency for the clathrate to settle toward the bottom of the aqueous phase, while remaining above the hydrate agent (which has a density of 1.47 g/cc). Thus, there was somewhat of a gradient within the aqueous phase, with the water at the top of the tank relatively depleted of clathrate in comparison to the water/clathrate slurry that was present in the middle of the tank.

This charging cycle continued for 8 hours until about 99% of the hydrate agent had been incorporated into clathrate crystals, which filled about ⅔ of the storage tank volume. The hydrate crystals had an average size of about 150 μm, and were easily resuspended by resuming injection of liquid into the tank through the nozzles 32.

The discharge cycle was initiated during daytime hours of peak electrical demand. Cold water was drawn off of the top of the storage tank 10 through the overflow tube 22 and into the standpipe 24, and thence was directed through the heat exchanger 30 by the mixing pump 26. The water temperature entering the heat exchanger was a constant 48° F., and the temperature upon exiting the heat exchanger was 53° F. Cooled heat transfer fluid from the other side of the heat exchanger was used for air conditioning. The warmed water from the heat exchanger was reinjected back into the storage tank, where it resuspended and gradually melted the clathrate crystals. During this discharge cycle, the water (or water-rich suspension) decanted from the top of the tank remained substantially at the phase change temperature of the clathrate until the phase change was complete. The energy density of the storage medium was calculated to be about 90 BTU/lb. Cooling was provided for 4 hours at a rate of 36,000 BTU/hour.

EXAMPLE 2: HYDRATE AGENT LIGHTER THAN WATER

A storage material comprising 169 gallons water and 37 gallons propane ($C_3H_8$) is charged into a 225 gallon cylindrical storage tank having the geometry shown in FIG. 8. This storage tank is a part of a thermal energy storage system configured as in FIG. 1. Also present as a part of the storage material is a zwitterionic fluorocarbon surfactant, sold by E. I. du Pont de Nemours, Wilmington, Del., under the trademark ZONYL FSK, and is present in the amount of about 550 ppm (measured in relationship to the entire contents of the storage tank). This storage material forms a Type II clathrate having a phase change temperature of 42° F. and a latent heat of fusion of 134 BTU/lb. The mole ratio of hydrate agent to water for this clathrate is 1:17.94, and the specified amount of water used in this Example is an excess of 25% over the amount required for clathrate formation with the hydrate agent present in the system. The system is pressurized to 5.5 atmospheres and maintained at that pressure throughout the procedure to maintain the hydrate agent in liquid form.

The storage or charge cycle is initiated by removing water from the bottom of the storage tank at a rate of 28 gallons/minute and simultaneously removing hydrate agent from near the top of the storage tank at a rate of 2 gallons/minute. The water and the hydrate agent ($C_3H_8$) are mixed in the mixing pump and directed through the heat exchanger. The heat exchanger used is a plate frame heat exchanger operating as an evaporator coil in a heat pump cycle.

The temperature of the liquid emulsion entering the heat exchanger is initially about 70° F., but within 85 minutes, that temperature drops to 42° F., the formation temperature of the clathrate. Simultaneously, a cold heat transfer fluid is introduced into the other side of the heat exchanger at a temperature of 36° F.

The heat transfer fluid is $CHClF_2$ from a heat pump operated outdoors at night with off-peak electricity. The temperature of the storage medium exiting the heat exchanger is a constant 38° F., and some crystal formation begins to take place at this point.

The cooled storage medium leaving the heat exchanger is directed through 4 nozzles into the upper mid portion of the storage tank. The nozzles are canted at an angle of about 60° with respect to a tangent to the circular storage tank at the point where the nozzles are located, and have a nozzle tip diameter of about ¼ inch so that the velocity of the fluid through the nozzle tip is about 10 feet/second, thus generating high shear forces and increasing nucleation and emulsification, while simultaneously inducing a swirling motion in the mixture in the tank about the axis of the tank. This swirling motion is effective to maintain the clathrate crystals in suspension. However, due to the fact that the density of the clathrate is 0.94 g/cc (compared to about 1.0 g/cc for the water), there is a tendency for the clathrate to settle toward the top of the aqueous phase, while remaining below the hydrate agent (which has a density of 0.50 g/cc). Thus, there is somewhat of a gradient within the aqueous phase, with the water at the bottom of the tank relatively depleted of clathrate in comparison to the water/clathrate slurry that is present in the middle of the tank.

This charging cycle continues for 7½ hours until about 98% of the hydrate agent has been incorporated into clathrate crystals, which fill about 75% of the storage tank. The hydrate crystals have an average size of about 300 μm, and are easily resuspended by resuming injection of liquid into the tank through the nozzles.

The discharge cycle is initiated during daytime hours of peak electrical demand. Cold water is drawn off of the bottom of the storage tank and thence is directed through the heat exchanger by a mixing pump. The water temperature entering the heat exchanger is a constant 42° F., and the temperature upon exiting the heat exchanger is 47° F. Cooled heat transfer fluid from the other side of the heat exchanger is used for air conditioning. The warmed water from the heat exchanger is reinjected back into the storage tank, where it resuspends and gradually melts the clathrate crystals. During this discharge cycle, the water (or water-rich suspension) from the bottom of the tank remains substantially at the phase change temperature of the clathrate until the phase change is complete. The energy density of the storage medium is calculated to be 115 BTU/lb. Cooling is provided for 3 hours at a rate of 60,000 BTU/hour.

Although only the preferred forms of the invention have been illustrated and exemplified, it will be apparent to those skilled in the art that various modifications may be made therein without departing from the spirit of the invention or from the scope of the appended claims.

What is claimed is:

1. A thermal storage system, comprising:
   a closed container;
   a storage medium in said container comprising water and a hydrate agent capable of forming clathrate crystals with said water, wherein the density of said hydrate agent is different from that of said water and wherein the amount of said water is in excess of the amount required to stoichiometrically form clathrate with all of said hydrate agent;
   means for continuously removing water from said container;
   means for continuously removing hydrate agent from said container; means for combining and intimately mixing said removed water and hydrate agent;
   means for cooling said intimately mixed water and hydrate agent to form a cooled solution; and
   nozzles for injecting said cooled solution into said container under pressure to form clathrate crystals in said container.

2. The system of claim 1, wherein said storage medium is separated into an aqueous phase and a hydrate agent phase and wherein said nozzles are located in said aqueous phase.

3. The system of claim 1, wherein said water is lighter than said hydrate agent and wherein said clathrate crystals are lighter than said hydrate agent and are heavier than said water.

4. The system of claim 1, wherein said water is heavier than said hydrate agent and wherein said clathrate crystals are lighter than said water and heavier than said hydrate agent.

5. The system of claim 3 or 4, wherein said storage medium further comprises a suspension of said clathrate crystals in said aqueous phase in a concentration gradient in said container going from highest adjacent to said hydrate agent phase to lowest at points vertically removed from said hydrate agent.

6. The system of claim 5, wherein said combining means comprises a pump.

7. The system of claim 5, wherein said cooled solution comprises an emulsion.

8. The system of claim 7, wherein said storage medium further comprises a surfactant to facilitate formation of said emulsion.

9. The system of claim 5, wherein said system further includes:
   means for inducing circulation patterns in said aqueous phase to suspend said crystals; and
   baffles between said circulation inducing means and the point at which said water is removed from said container to limit circulation patterns at that point and thereby cause the removed water to be depleted of said crystals.

10. The system of claim 5, wherein said water is lighter than said hydrate agent, and wherein said means for removing water comprises a water outlet at the top of said aqueous phase into which water relatively depleted in crystals may flow.

11. The system of claim 10, further comprising a standpipe connected to said outlet and extending downwardly therefrom, said standpipe located upstream of said mixing means.

12. The system of claim 11, wherein said standpipe is located outside said container.

13. The system of claim 11, wherein said standpipe is located inside said container.

14. The system of claim 5, wherein said crystals have an average size no greater than 1000 $\mu$m.

15. The system of claim 5, wherein said crystals have an average size not to exceed about 500 $\mu$m.

16. The system of claim 1, wherein said nozzles are adapted to emulsify said cooled solution.

17. The system of claim 1, wherein said nozzles are at an acute angle with respect to a tangent to the outside of the container where the nozzles are located, so that said nozzles generate circulation patterns in said aqueous phase.

18. A method of latent and sensible heat storage and transfer, comprising the steps of:
   providing a container having a storage medium therein, said storage medium comprising water and a hydrate agent capable of forming a clathrate with said water, said medium separating into an aqueous phase and a liquid hydrate agent phase;
   continuously removing water from said aqueous phase;
   continuously removing hydrate agent from said hydrate agent phase;
   combining said removed water and removed hydrate agent to form an emulsion;
   cooling said emulsion to a temperature at or below the temperature of formation of said clathrate; and
   injecting said cooled emulsion into said storage medium through nozzles under pressure to mix said storage medium and to form clathrate crystals.

19. The method of claim 18, further comprising the step of:
   maintaining said crystals in suspension in said aqueous phase, wherein the average size of said crystals does not exceed about 1000 $\mu$m.

20. The method of claim 19, further comprising continuing said cooling and injecting steps until substantially all available hydrate agent has formed clathrate with said water.

21. The method of claim 20, wherein at least 50% of said hydrate agent is formed into clathrate.

22. The method of claim 20, wherein at least 70% of said hydrate agent is formed into clathrate.

23. The method of claim 20, wherein at least 85% of said hydrate agent is formed into clathrate.

24. The method of claim 20, further comprising discharging said system after substantially all available hydrate agent has formed clathrate, by the steps of:
   continuously removing cooled water from said container;
   adding external heat to said water in a heat exchanger;
   continuously injecting said heated water into said container and agitating the contents of said container to suspend said crystals in said aqueous phase, whereby the external heat added to said injected water causes some of said crystals to melt, thereby cooling said injected water; and
   continuing to remove cooled water, add heat thereto, and inject said heated water into said container until substantially all of said crystals have melted.

25. The method of claim 18, wherein said clathrate crystals have an average size not to exceed about 500 $\mu$m.

26. A heat energy storage system, comprising:
   a closed container;
   an aqueous phase in said container containing water;
   a liquid hydrate agent phase in said container having a density different from that of said aqueous phase, said hydrate agent selected to form clathrate crystals with water;
   clathrate crystals suspended in said aqueous phase having a density intermediate of that of said water and said hydrate agent, said crystal suspension having a density gradient from greatest adjacent said hydrate agent phase to least at points vertically removed from said hydrate agent phase, wherein said crystals have been formed from an emulsion of hydrate agent and water and have an average crystal size not greater than about 1000 $\mu$m.

* * * * *